United States Patent Office 3,709,880
Patented Jan. 9, 1973

3,709,880
ANTIBIOTIC PURIFICATION PROCESS
Robert T. Goegelman, Linden, and Thomas W. Miller, Carteret, N.J., assignors to Merck & Co., Inc., Rahway, N.J.
No Drawing. Continuation-in-part of abandoned application Ser. No. 19,497, Mar. 13, 1970. This application Dec. 9, 1970, Ser. No. 96,674
Int. Cl. C07d 99/24
U.S. Cl. 260—243 C    8 Claims

ABSTRACT OF THE DISCLOSURE

Fermentation broths or impure solutions containing 7-(D-5-amino - 5 - carboxyvaleramido)-3-(carbamoyloxymethyl)-7-methoxy-3-cephem-4-carboxylic acid, a substance having antibiotic activity against gram-negative and gram-positive microorganisms, are purified using ion exchange resins or adsorbents such as activated carbon and poly-acrylamide or dextran gels.

BACKGROUND OF THE INVENTION

This is a continuation-in-part of applicants' copending application Ser. No. 19,497, filed Mar. 13, 1970 now abandoned.

New and useful antibiotics are obtained by growing strains of a particular microorganism in suitable aqueous nutrient media under controlled conditions. Generally, before such antibiotics are of any practical value, they must be obtained in purified form free of the other organic materials present in fermentation broths or concentrates thereof. The present invention is directed to the methods for recovering such an antibiotic in purified form.

SUMMARY

This invention relates to methods for recovering and purifying the novel antibiotic substance 7-(D-5-amino-5-carboxyvaleramdio) - 3 - (carbamoyloxymethyl) - 7 - methoxy-3-cephem-4-carboxylic acid or salts thereof from aqueous solutions containing said antibiotic, by contacting the fermentation broth in which the antibiotic was produced or a solution of partially purified antibiotic with an anion or cation exchhange resin to adsorb the antibiotic on such resin, and thereafter eluting the antibiotic from the resin adsorbate with water, an aqueous or aqueous alcoholic salt solution, or a base, the preferred eluant depending on the type of resin used. The antibiotic of Formula I below may also be purified by chromatography on activated carbon, a polyacrylamide or a dextran gel. 7-(D-5-amino-5-carboxyvaleramido)-3-(carbamoyloxymethyl)-7-methoxy-3-cephem-4-carboxylic acid and its salts are effective in inhibiting the growth of various gram-negative and gram-positive microorganisms.

DESCRIPTION OF THE PREFERRED EMBODIMENTS 7-(D-5-amino-5-carboxyvaleramido)-3-(carbamoyloxymethyl)-7-methoxy-3-cephem-4-carboxylic acid having Formula I below is produced during the aerobic fermentation of suitable aqueous nutrient media, under controlled conditions, by a strain of Streptomyces lactamdurans capable of producing said compound, for instance by the strain on unrestricted permanent deposit in the culture collection of the Northern Utilization Research and Development Branch of the U.S. Department of Agriculture at Peoria, Ill. under accession number NRRL 3802, and is active in inhibiting the growth of gram-positive and gram-negative microorganisms.

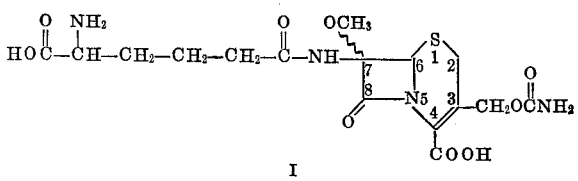

I

This compound is amphoteric with an apparent isoelectric point of about pH 3.5, and is stable in solution at pH's of about 1.5–9.0.

By the present invention, it has been found that 7-(D-5-amino-5-carboxyvaleramido)-3-(carbamoyloxymethyl)-7-methoxy-3-cephem-4-carboxylic acid and salts thereof can be purified by adsorbing the impure antibiotic in the form of the crude fermentation broth or in a partially purified state on a cationic or anionic exchange resin and eluting the purified material with a suitable eluant. Where an anion exchange resin is used, it is preferred to use a strongly basic resin although weakly basic resins can also be employed; where a cation exchange resin is employed, it is preferred to use a strongly acidic resin. Generally, a resin composed of quaternary ammonium exchange groups attached to a styrene-divinylbenzene polymer lattice on the chloride cycle is employed as the basic anion exchange resin, one suitable example being the polystyrene trimethylbenzylammonium resin Dowex 1 X2, but resins composed of polyalkylamine groups attached to a styrene-divinylbenzene polymer lattice and crosslinked acrylic resins may also be employed; a resin of the sulfonate type having a styrene-divinylbenzene matrix, for example the polystyrene nuclear sulfonic acid resin Dowex 50 X2, on the hydrogen cycle is generally employed as the acidic cation exchange resin.

A preferred method for recovering purified antibiotic of Formula I, or a salt thereof, is to pass a solution of the antibiotic, such as a fermentation broth, the pH of which has been adjusted to about pH 7 through a column containing an anion exchange resin of the quaternary ammonium type on the chloride cycle. Although the pH of the broth is generally adjusted to pH 7, the crude broth may be used directly without adjusting the pH, and the pH of the column feed is not unduly critical. The resulting resin adsorbate is then eluted with an aqueous or aqueous alcoholic salt solution such as a 3% ammonium chloride solution in 90% methanol, or 5% aqueous sodium chloride. The eluates are collected in fractions, the size of the fraction depending upon the size of the column employed. The bioactivity of the eluates is measured by assaying the eluate by means of an assay using Vibrio percolans as the assay organism. The fractions containing most of the active material are then concentrated, generally in vacuo, to remove any organic solvent, and the concentrate is diluted with water. This purification using an anion exchange resin is, of course, not limited to fermentation broths but may be used with any impure solution of the compound of Formula I.

In addition to utilization of an anion exchange resin, the compound of Formula I or a salt thereof may be purified by contacting an aqueous solution thereof, including a fermentation broth, with a strongly acidic cation exchange resin of the sulfonate type on the hydrogen cycle. The solution of antibiotic is adjusted to an acidic pH in the range of pH 1.5–7 prior to contact with the resin. The resin adsorbate is then eluted with a base in order to recover the antibiotic. The choice of base is not unduly critical although it is preferred to employ an organic base such as pyridine, a picoline, a lutidine, or a trialkylamine, or an inorganic base such as ammonium hydroxide. As in the case of the anion exchange resin, the eluates are collected in fractions and the bioactivity contained in such fractions measured with a *Vibrio percolans* microorganism.

Eluants which may be employed in this process include both acids and bases of which the following are typical: aqueous solutions or aqueous alcoholic solutions of inorganic salts such as sodium chloride, potassium chloride or ammonium chloride and the like; aqueous solutions of inorganic hydroxides as, for example, aqueous solutions of ammonium hydroxide or sodium hydroxide and the like; organic amines, for example, trialkylamines, such as trimethylamine or triethylamine and the like or nitrogen-containing heterocyclicamines such as pyridine or picoline and the like; or mineral acids such as hydrochloric acid, sulfuric acid or phosphoric acid.

In practice, when the adsorbent is a strongly basic anion exchange resin such as Dowex 1 X2 it is most desirable to elute the purified material with an aqueous solution or aqueous alcoholic solution of an inorganic salt, preferably one which is a source of chloride ions. Illustrative of such eluates are, for example, solutions of ammonium chloride and sodium chloride.

Also, when the adsorbent is a cation exchange resin as, for example, a polystyrene nuclear sulfonic acid resin such as Dowex 50 X2 it is preferable to use as the eluant a solution of an inorganic hydroxide such as ammonium hydroxide or sodium hydroxide or solutions of organic amines such as tri-lower alkylamine or heterocyclic amines.

7-(D-5-amino-5-carboxyvaleramido) - 3 - (carbamoyloxymethyl)-7-methoxy-3-cephem - 4 - carboxylic acid may also be purified by passing an impure or partially purified aqueous solution thereof through a gel filtration resin such as a polyacrylamide or dextran gel. Generally, a gel of 50–100 mesh which will allow the fractionization, desalting, and concentration of substances with molecular weights from 200–2000 is used, although gels of 50–400 mesh may also be employed. The mesh is not a limiting factor, and the particular mesh employed will depend upon the size of the column to be used. Examples of suitable gels are spherical dextran cross-linked with epichlorhydrin and available in bead form as Sephadex G-10 from the Pharmacia Company, Sweden; and spherical polyacrylamides cross-linked with methylene bis-acrylamide available as Bio-Gel P-2 from Bio Rad Laboratories, Richmond, Calif. The pH of the antibiotic solution to be purified is preferably adjusted to about neutral, and the solution contacted and equilibrated with the gel. The antibiotic is then removed from the gel with water or another suitable eluting agent. The eluate is collected in fractions and those determined to be most active by bioassay are combined.

In accordance with still another aspect of the invention, solutions of 7-(D-5-amino-5-carboxyvaleramido)-3-(carbamoyloxymethyl)-7-methoxy-3-cephem - 4 - carboxylic acid are purified by digestion with activated carbon. The antibiotic is adsorbed on the carbon and is recovered therefrom by elution with an aqueous polar solvent, 60% aqueous acetone being an example of a suitable elutrient. As with the purification methods previously described, the elution is conducted so that fractions or "cuts" are obtained which are bioassayed to determine those containing the highest concentration of antibiotic.

It should be emphasized that some or all of the methods described herein for purifying and/or recovering 7-(D-5-amino-5-carboxyvaleramido) - 3 - (carbamoyloxymethyl)-7-methoxy-3-cephem-4-carboxylic acid or its salts from impure aqueous solutions may be applied in any sequence to a given antibiotic solution, although it is preferred to use the ion exchange resin purification for the more impure solutions. The gel and activated carbon methods are preferred when the starting material has already been at least partially purified.

The antibiotic compound of Formula I above and its salts demonstrate resistance not only to penicillinase but to the cephalosporinases as well and exhibit an enhanced activity against gram-negative microorganisms. Unlike cephalosporin C which has a relatively low antibacterial activity, the products of this invention exhibit a significant in vivo gram-negative effect with a potency which, in general, is greater than cephalothin. This activity includes effectiveness in vivo on *Proteus morganii* and, in addition, an effectiveness against the following gram-negative bacteria: *Escherichia coli, Proteus vulgaris, Proteus mirabilis, Salmonella schottmuelleri, Klebsiella pneumoniae* AD, *Klebsiella pneumoniae* B and *Paracolobactrum arizoniae*.

Bioassays for this antibiotic are run by a disc-plate procedure using 0.5 inch filter paper discs. The assay plates are prepared using Difco nutrient agar plus 2.0 g./l. Difco yeast extract at 10 ml. per plate. An overnight growth of the assay organism, *Vibrio percolans* ATCC 8461 is diluted in sterile saline solution to a suspension having 40% transmittance at a wave length of 660 m$\mu$. This suspension is added at 20 ml./liter of medium prior to pouring the plates.

The assay plates are held at 4° C. until used (5 day maximum). Following the appliction of the antibiotic-saturated assay discs the plates are incubated at 28° C. for a period of from 8 to 24 hours. Zones of inhibition are read as mm. diameter. They are used to determine relative potencies or, when compared with a purified reference standard, the potency in $\mu$g./ml.

7-(D-amino - 5 - carboxyvaleramido)-3-(carbamoyloxymethyl-7-methoxy-3-cephem-4-carboxylic acid is produced during the aerobic fermentation of suitable aqueous nutrient mediums under controlled conditions via the inoculations with the organism *Streptomyces lactamdurans* NRRL 3802. Aqueous mediums, such as those employed for the production of other antibiotics are suitable for producing the antibiotic 7-(D-5-amino-5-carboxyvaleramido)-3 - (carbamoyloxymethyl)-7-methoxy-3-cephem - 4 - carboxylic acid. Such mediums contain sources of carbon and nitrogen assimilable by the microorganism and inorganic salts.

In general, carbohydrates such as sugars, for example, glucose, arabinose, maltose, raffinose, xylose, mannitol and the like and starches such as grains, for example, oats, rye, corn starch, corn meal and the like can be used either alone or in combination as sources of assimilable carbon in the nutrient medium. The exact quantity of the carbohydrate source or sources utilized in the medium depend in part upon the other ingredients of the medium but, in general, the amount of carbohydrate usually varies between about 1% and 6% by weight of the medium. These carbon sources can be used individually or several such carbon sources may be combined in the medium. In general any proteinaceous material may be used as a nitrogen source in the fermentation process. Suitable nitrogen sources include, for example, yeast hydrolysates, amber yeast, soybean meal, hydrolysates of casein, corn steep liquor, distilled solubles or tomato paste and the like. The sources of nitrogen, either alone or in combination, are used in amounts ranging from about 0.2 to 6% by weight of the aqueous medium.

The fermentation is carried out at temperatures ranging from about 20° C. to 37° C.; however, for optimum results it is preferable to conduct the fermentation at temperatures of from about 24° C. to 32° C. The pH of the nutrient mediums suitable for growing the *Streptomyces lactamdurans* culture and producing the antibiotic should be in the range of from about 6.0 to 8.0.

The following examples are for the purpose of illustration and not by way of limitation.

EXAMPLE 1

Step A: Fermentation

A lyophilized tube of *Streptomyces lactamdurans* culture (NRRL 3802) was used to inoculate 50 ml. of sterile Medium I in a baffled 200 ml. Erlenmeyer flask.

Medium I:

| | |
|---|---|
| Yeast autolysate (ardamine) _____ g__ | 10.0 |
| Glucose _____ g__ | 10.0 |
| Phosphate buffer [1] _____ ml__ | 2.0 |
| $MgSO_4 \cdot 7H_2O$ _____ g__ | 0.05 |
| Distilled water _____ ml__ | 1000.0 |
| pH _____ | 6.5 |

[1] Phosphate buffer:

| | |
|---|---|
| $KH_2PO_4$ _____ g__ | 91.0 |
| $Na_2HPO_4$ _____ g__ | 95.0 |
| Distilled water _____ ml__ | 1000.0 |

The inoculated flask was then placed on a 220 r.p.m. rotary shaker with a two inch throw and incubated for 72 hours at 28° C.

Five ml. aliquots (10% inoculum) of this growth were then transferred, using sterile pipettes, to four second-stage seed flasks of the same size and containing the same medium as described above and these flasks were then shaken in the manner indicated above. The second-stage seed flasks were then pooled asceptically into one flask and used to inoculate 11 two-liter baffled Erlenmeyer flasks, each containing 350 ml. of Medium II with 2–3% inoculum using sterile pipettes. The Medium II has the following composition:

Medium II:

| | |
|---|---|
| Amber Yeast No. 300 _____ g__ | 10.0 |
| Distiller's solubles _____ g__ | 20.0 |
| Dextrose _____ g__ | 10.0 |
| Distilled water _____ ml__ | 1000.0 |
| pH _____ | 7.0 |

The production flasks were then shaken at 28° C. on a 145 r.p.m. shaker with a two inch throw for four days. At the end of the incubation period the contents of 10 such flasks were combined and a sample was centrifuged to remove the mycelium.

Step B: Adsorption on an anion exchange resin

The filtered broth was adjusted to pH 7.0 with dilute hydrochloric acid and 2900 ml. was passed over 100 ml. of Dowex 1 X2 (a strongly basic anion exchange resin having a styrene-divinyl-benzene matrix) on the chloride cycle at a rate of 10 ml./minute. The effluent was collected in 500 ml. fractions. The resin column was washed with water and eluted with 3% $NH_4Cl$ in 90% methanol. The eluate was collected in 100 ml. fractions.

Disc plate assays against *Vibrio percolans* ATCC 8461 were run on all fractions, and the zone diameters are tabulated below.

| Filtered broth | | Effluent fraction | | Eluate fraction | |
|---|---|---|---|---|---|
| Dilution | Zone size, mm. | Fraction | Zone size | Fraction | Zone size |
| None | 26.5 | 1 | 0 | 1 | 25 |
| 1:2 | 24 | 2 | 16 | 2 | 29 |
| 1:4 | 20 | 3 | 23 | 3 | 29 |
| | | 4 | 25 | 4 | 26.5 |
| | | 5 | 27 | 5 | 22 |
| | | 6 | 27 | 6 | 18 |
| | | | | 7 | 15 |
| | | | | 8–10 | 0 |

These assays indicate that the resin capacity is only two fractions or 10 column volumes of broth.

Step C: Adsorption on an anion exchange resin

Fractions 3 through 6 from Step B were combined to give 1960 ml. of solution. An 1860 ml. portion of the solution was adjusted from pH 7.2 to 8.0 with dilute sodium hydroxide and passed over 100 ml. of Dowex 1 X2 (a strongly basic anion exchange resin having a styrene-divinylbenzene matrix) on the chloride cycle at a rate of 14 ml./minute. The spent was collected in four equal fractions and assays indicated that 5% of the activity was present. The column was washed with water and eluted with 5% aqueous sodium chloride. The eluate was collected in 50 ml. fractions and assayed. The assays indicated that 90% of the activity was present in cuts 3 through 16. These were concentrated.

Step D: Adsorption on a cation exchange resin

A 50 ml. portion of the combined fractions 3 through 16 was diluted to 500 ml., adjusted from pH 8.8 to pH 2.0 with dilute hydrochloric acid and adsorbed on 25 ml. of Dowex 50 X2 (a strongly acidic cation exchange resin of the sulfonate type having a styrene-divinylbenzene matrix) on the hydrogen cycle at a rate of 2.5 ml./min. The column was washed with 25 ml. of water, then eluted with 2% aqueous pyridine until the pH of the column effluent rose to pH 7 (54 ml.). Assays of the spent fraction and eluate indicated 9% of the activity was in the spent and 90% in the pyridine eluate. The eluate contained the pyridinium salt of 7-(D-5-amino - 5 - carboxyvaleramido)-3-(carbamoyloxymethyl) - 7 - methoxy-3-cephem-4-carboxylic acid. It was adjusted to pH 8.0 with dilute sodium hydroxide and concentrated in vacuum to remove pyridine. The product thus obtained was identified as the monosodium salt of 7-(D-5-amino-5-carboxyvaleramido)-3-(carbamoyloxymethyl) - 7 - methoxy-3-cephem-4-carboxylic acid. The molecular weight is 468 based on the empirical formula $C_{16}H_{21}N_4SO_9Na$. The product is amphoteric with an apparent isoelectric point at about pH 3.5. It is unstable above pH 9 but stable at pH 1.5.

EXAMPLE 2

Adsorption on carbon: Four separate fermentation broths were prepared as described in Example 1, Step A, and treated with Dowex 1 X2 resin as described in Example 1, Steps B and C, and the resin adsorbate eluted with 1% aqueous sodium chloride. The eluate was collected in 50 ml. fractions and assayed. The eluate fractions from all four batches rich in 7 - (D-5-amino-5-carboxyvaleramido)-3-(carbamoyloxymethyl) - 7 - methoxy-3-cephem-4-carboxylic acid were adjusted to pH 5 with dilute hydrochloric acid and combined to give 4300 ml. of solution. 4200 ml. of this solution was stirred with 42 g. of activated carbon (Darco G–60) for ½ hour. The carbon was collected by filtration and washed with water. The filtrate and wash were void of activity. The carbon cake was eluted twice with a one liter portion of 60% aqueous acetone by stirring the mixture for ½ hour and filtering each time. The eluates were concentrated under vacuum to 108 ml. and 100 ml., respectively. Bioassays with *Vibrio percolans* ATCC 8461 indicated that the first eluate contained 76% of the activity, 18 times as potent as the starting material and that the second contained 17% of the activity, 14 times as potent as the starting material. The two concentrates were combined and concentrated further to 61 ml. and adjusted from pH 4 to pH 5 with dilute sodium hydroxide. This concentrate contained 40 mg./ml. of dry solids and gave a 25 mm. zone against *Vibrio percolans* ATCC 8461 at a dilution of 1:100 (400 mcg./ml.). The product was identified as the monosodium salt of 7-(D-5-amino-5-carboxyvaleramido) - 3 - (carbamoyloxy) - 7 - methoxy - 3 - cephem-4- carboxylic acid.

EXAMPLE 3

Separation on gel: A 22 ml. portion of the combined fractions 3 through 16 obtained according to Example 1, Step C, was adjusted to pH 7.0 with dilute sodium hydroxide and chromatographed on a column containing 388 ml. of BiO-Gel P-2, a spherical polyacrylamide cross-linked with methylene bis acrylamide. The column was developed with water, the effluent monitored with a differential refractometer and 5 ml. fractions collected automatically and bioassayed. The bioactivity appeared in fractions 47 through 63 while sodium chloride appeared in fractions 62 through 72. Fractions 50 through 60 were pooled and concentrated to dryness to yield 10.8 mg. of product containing primarily the monosodium salt of 7-(D-5-amino-5-carboxyvaleramido) - 3 - (carbamoyloxymethyl)-7-methoxy-3-cephem-4-carboxylic acid. The product on assay with *Vibrio percolans* gives a 25 mm. zone at 8 mcg./ml.

EXAMPLE 4

Separation on Dextran gel: The monosodium salt of 7-(D-5-amino-5-carboxyvaleramido) - 3 - (carbamoyloxymethyl)-7-methoxy-3-cephem-4-carboxylic acid (1.0 g.) of Example 3 was dissolved in 20 ml. of 1% aqueous n-butanol and chromatographed on a column containing 2,530 ml. of Sephadex G–10, a modified Dextran gel in bead form. The column was developed with 1% aqueous n-butanol at 10 ml. per minute and 10.5 ml. fractions were collected automatically. The effluent was monitored with a recording refractometer and the fractions were bioassayed. The bioactivity appeared in fractions 90 through 122 and these were pooled and concentrated to dryness to yield 670 mg of product containing primarily the mono-sodium salt of 7-(D-5-amino - 5 - carboxyvaleramido)-3-(carbamoyloxymethyl)-7-methoxy - 3 - cephem-4-carboxylic acid.

The column was subsequently calibrated by chromatography on a mixture of Blue Dextran 2000 and sodium chloride under identical conditions. Blue Dextran 2000 was detected in fractions 85 through 93 and sodium chloride was detected in fractions 140 through 155, thus indicating that the bioactive product can be separated from impurities of this nature.

Any departure from the above description which conforms to the present invention is intended to be included within the scope of the claims.

What is claimed is:

1. A process for recovering the antibiotic 7 - (D - 5-amino - 5 - carboxyvaleramido) - 3 - carbamoyloxymethyl) - 7 - methoxy - 3 - cephem - 4 - carboxylic acid or a salt thereof from impure aqueous solutions containing said antibiotic which comprises passing a fermentation broth or a solution containing said antibiotic through a column of an ion exchange resin selected from the group consisting of anion exchange resins containing quaternary ammonium exchange groups on the chloride cycle or polyalkylamine groups attached to a styrene-divinylbenzene matrix and strongly acidic cation exchange resins containing nuclear sulfonic acid exchange groups on the hydrogen cycle, followed by elution of the resin adsorbate with an eluting solvent, collecting the eluates, and combining the active fractions.

2. The process of claim 1 wherein the anion exchange resin is composed of quaternary ammonium exchange groups attached to a styrene-divinylbenzene polymer lattice.

3. The process of claim 1 wherein the cation exchange resin is composed of nuclear sulfonic acid exchange groups attached to a styrene-divinylbenzene polymer lattice.

4. The process of claim 2 wherein the eluting solvent is an aqueous or aqueous alcoholic salt solution and the salt is a water-soluble alkali metal salt or an ammonium salt.

5. The process of claim 3 wherein the eluting solvent is an organic base or ammonium hydroxide.

6. The process of claim 1 which additionally comprises chromatographing the combined active fractions on polyacrylamide gel having an operating range of 200–2000 and developing the gel adsorbate with water.

7. The process of claim 1 which additionally comprises contacting the combined active fractions with activated carbon to adsorb the antibiotic thereon, and thereafter eluting the activated carbon with aqueous acetone.

8. The process of claim 1 which additionally comprises chromatographing the combined active fractions on a modified dextran gel in bead form and developing the gel adsorbate with an aqueous 1% n-butanol solution.

References Cited
UNITED STATES PATENTS

| | | | |
|---|---|---|---|
| 3,093,638 | 6/1963 | Abraham et al. | 260—243 C |
| 3,467,654 | 9/1969 | McCormick | 260—243 C |

NICHOLAS S. RIZZO, Primary Examiner